(12) United States Patent
Onoda et al.

(10) Patent No.: US 7,071,985 B1
(45) Date of Patent: Jul. 4, 2006

(54) OPTICAL DEVICE AND METHOD FOR SELECTING OBJECT OF FOCUS

(75) Inventors: Hitoshi Onoda, Yokohama (JP); Keiji Ohtaka, Yokohama (JP); Terutake Kadohara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,937

(22) Filed: Dec. 22, 1998

(30) Foreign Application Priority Data

Dec. 25, 1997 (JP) ................................. 9-358512

(51) Int. Cl.
G03B 13/32 (2006.01)
(52) U.S. Cl. ...................................... 348/349; 396/123
(58) Field of Classification Search ................ 348/345, 348/348, 349, 350, 353, 355; 396/121, 122, 396/123
See application file for complete search history.

(56) References Cited

U.S. PATENT DOCUMENTS

| | | | | |
|---|---|---|---|---|
| 4,520,240 A | * | 5/1985 | Swindler .................... | 200/5 R |
| 4,555,169 A | | 11/1985 | Suda et al. ................. | 354/407 |
| 4,618,236 A | | 10/1986 | Akashi et al. .............. | 354/406 |
| 4,634,255 A | | 1/1987 | Suda et al. ................. | 354/406 |
| 4,643,557 A | | 2/1987 | Ishizaki et al. ............ | 354/406 |
| 4,670,645 A | | 6/1987 | Ohtaka et al. .............. | 250/201 |
| 4,688,920 A | | 8/1987 | Suda et al. ................. | 354/406 |
| 4,699,493 A | | 10/1987 | Koyama et al. ............ | 354/406 |
| 4,716,282 A | | 12/1987 | Akashi et al. .............. | 250/201 |
| 4,728,785 A | | 3/1988 | Ohnuki et al. .............. | 250/201 |
| 4,739,157 A | | 4/1988 | Akashi et al. .............. | 250/201 |
| 4,774,539 A | | 9/1988 | Suda et al. ................. | 354/406 |
| 4,792,668 A | | 12/1988 | Akashi et al. .............. | 250/201 |
| 4,792,669 A | | 12/1988 | Ohnuki et al. .............. | 250/201 |
| 4,800,410 A | | 1/1989 | Akashi et al. .............. | 354/408 |
| 4,801,963 A | | 1/1989 | Koyama et al. ............ | 354/403 |
| 4,812,869 A | | 3/1989 | Akashi et al. .............. | 354/408 |
| 4,825,239 A | | 4/1989 | Suda et al. ................. | 354/402 |
| 4,833,313 A | | 5/1989 | Akashi et al. .............. | 250/201 |
| 4,841,326 A | | 6/1989 | Koyama et al. ............ | 354/406 |
| 4,849,782 A | | 7/1989 | Koyama et al. ............ | 354/408 |
| 4,855,777 A | | 8/1989 | Suda et al. ................. | 354/402 |
| 4,859,842 A | | 8/1989 | Suda et al. ................. | 250/201 |
| 4,907,026 A | | 3/1990 | Koyama et al. ............ | 354/403 |
| 4,908,645 A | | 3/1990 | Higashihara et al. ....... | 354/402 |
| 4,922,282 A | | 5/1990 | Koyama et al. ............ | 354/406 |
| 4,954,701 A | | 9/1990 | Suzuki et al. ............. | 250/201.8 |
| 4,959,677 A | | 9/1990 | Suda et al. ................. | 354/402 |

(Continued)

FOREIGN PATENT DOCUMENTS

JP 61-182516 8/1986

(Continued)

Primary Examiner—Tuan Ho
Assistant Examiner—Timothy J. Henn
(74) Attorney, Agent, or Firm—Fitzpatrick, Cella, Harper & Scinto

(57) ABSTRACT

A camera capable of automatically detecting a main object in a sensed image. A distance distribution generation unit discriminates a plurality of areas in the sensed image on the basis of a predetermined condition, and a main object area determination unit automatically determines the main object area out of the discriminated areas. If the determined main object area is different from the area where an operator intends to focus on and the operator wishes to change the main object area, a new main object area is selected in accordance with an instruction inputted from a main object area changing unit. Then, the camera focuses on the selected main object area.

27 Claims, 13 Drawing Sheets

U.S. PATENT DOCUMENTS

| | | | | |
|---|---|---|---|---|
| 4,969,003 A | | 11/1990 | Ohnuki et al. | 354/402 |
| 4,972,221 A | | 11/1990 | Ohnuki et al. | 354/402 |
| 4,974,002 A | | 11/1990 | Ohnuki et al. | 354/400 |
| 4,974,003 A | | 11/1990 | Ohnuki et al. | 354/400 |
| 4,975,727 A | | 12/1990 | Ohtaka et al. | 354/402 |
| 4,980,716 A | | 12/1990 | Suzuki et al. | 354/403 |
| 4,992,817 A | | 2/1991 | Aoyama et al. | 354/403 |
| 4,992,819 A | | 2/1991 | Ohtaka et al. | 354/408 |
| 4,994,843 A | * | 2/1991 | Kitazawa | 396/123 |
| 4,998,124 A | * | 3/1991 | Ishida et al. | 396/130 |
| 5,003,400 A | * | 3/1991 | Murakami et al. | 348/347 |
| 5,005,037 A | | 4/1991 | Akashi et al. | 354/400 |
| 5,005,041 A | | 4/1991 | Suda et al. | 354/407 |
| 5,060,002 A | | 10/1991 | Ohnuki et al. | 354/402 |
| 5,061,951 A | | 10/1991 | Higashihara et al. | 354/400 |
| 5,061,953 A | | 10/1991 | Higashihara et al. | 354/402 |
| 5,079,581 A | | 1/1992 | Kadohara et al. | 354/400 |
| 5,081,479 A | | 1/1992 | Kadohara et al. | 354/402 |
| 5,089,843 A | | 2/1992 | Higashihara et al. | 354/402 |
| 5,103,254 A | * | 4/1992 | Bell et al. | 396/147 |
| 5,126,777 A | | 6/1992 | Akashi et al. | 354/402 |
| 5,138,260 A | * | 8/1992 | Molyneaux et al. | 324/309 |
| 5,151,732 A | | 9/1992 | Akashi et al. | 354/402 |
| 5,235,428 A | * | 8/1993 | Hirota et al. | 348/355 |
| 5,311,241 A | | 5/1994 | Akashi et al. | 354/402 |
| 5,333,028 A | | 7/1994 | Akashi et al. | 354/402 |
| 5,365,302 A | * | 11/1994 | Kodama | 396/121 |
| 5,382,996 A | | 1/1995 | Kadohara | 354/403 |
| 5,392,088 A | * | 2/1995 | Abe et al. | 396/79 |
| 5,404,152 A | * | 4/1995 | Nagai | 345/157 |
| 5,496,106 A | * | 3/1996 | Anderson | 348/255 |
| 5,608,489 A | * | 3/1997 | Ozaki | 396/51 |
| 5,615,398 A | | 3/1997 | Matsuyama | 396/77 |
| 5,625,415 A | * | 4/1997 | Ueno et al. | 348/350 |
| 5,629,735 A | * | 5/1997 | Kaneda et al. | 348/350 |
| 5,640,619 A | * | 6/1997 | Takayama et al. | 396/137 |
| 5,659,823 A | * | 8/1997 | Mukai et al. | 396/291 |
| 5,682,559 A | * | 10/1997 | Yoshino et al. | 396/121 |
| 5,684,627 A | * | 11/1997 | Ganser et al. | 359/388 |
| 5,729,771 A | | 3/1998 | Ohtaka | 396/113 |
| 5,745,175 A | * | 4/1998 | Anderson | 348/345 |
| 5,771,413 A | | 6/1998 | Suda et al. | 396/114 |
| 5,797,049 A | | 8/1998 | Ohtaka et al. | 396/122 |
| 5,839,001 A | | 11/1998 | Ohtaka et al. | 396/114 |
| 5,864,721 A | | 1/1999 | Suda et al. | 396/114 |
| 5,890,021 A | * | 3/1999 | Onoda | 396/121 |
| 5,895,130 A | * | 4/1999 | Saito et al. | 396/130 |
| 5,900,927 A | * | 5/1999 | Hasegawa | 356/3.13 |
| 5,913,082 A | * | 6/1999 | Onoda | 396/128 |
| 6,035,139 A | * | 3/2000 | Nakamura | 396/121 |
| 6,067,114 A | * | 5/2000 | Omata et al. | 348/345 |
| 6,370,262 B1 | * | 4/2002 | Kawabata | 396/121 |
| 6,977,687 B1 | * | 12/2005 | Suh | 348/345 |
| 2002/0061127 A1 | * | 5/2002 | Bacus et al. | 382/128 |

FOREIGN PATENT DOCUMENTS

| | | |
|---|---|---|
| JP | 4-67607 | 10/1992 |
| JP | 7-134238 | 5/1995 |
| JP | 9-127405 | 5/1997 |
| JP | 9-211316 | 8/1997 |
| JP | 10-161013 | 6/1998 |

* cited by examiner x

|   | 0 | 1 | 2 | ... |  |  |  |  |  | m-1 |
|---|---|---|---|---|---|---|---|---|---|---|
| 0 | 1 | 1 | 1 |  |  |  |  |  |  |  |
| 1 | 1 | 1 | 1 |  |  |  |  | 2 | 2 | 2 |
| 2 |  |  | 3 | 3 |  |  |  | 2 | 2 | 2 |
|   |  |  | 3 | 3 |  | 4 | 4 |  |  |  |
| y |  | 3 | 3 | 3 | 3 | 4 | 4 |  | 6 | 6 | 6 |
|   | 5 | 3 | 3 | 3 | 3 | 4 | 4 | 4 | 6 | 6 | 6 |
|   |  | 3 | 3 | 3 | 3 | 4 | 4 | 4 |  |  |  |
| n-1 |  | 3 | 3 | 3 | 3 | 4 | 4 | 4 |  |  |  |

FIG. 15A PRIOR ART
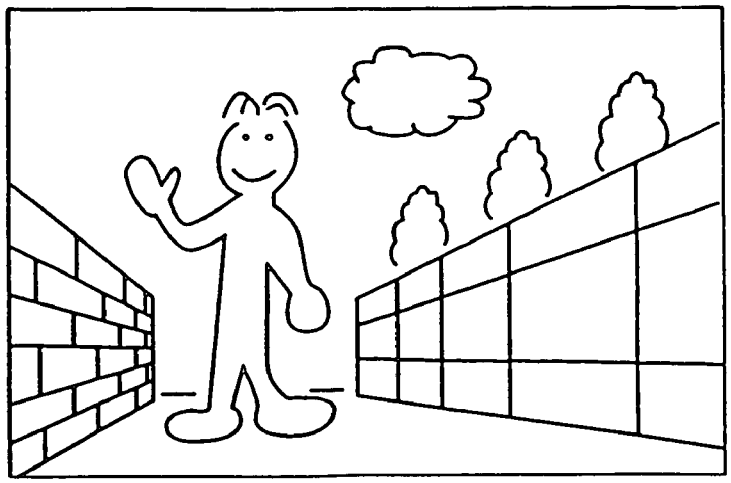
FIG. 15B PRIOR ART
FIG. 15C PRIOR ART
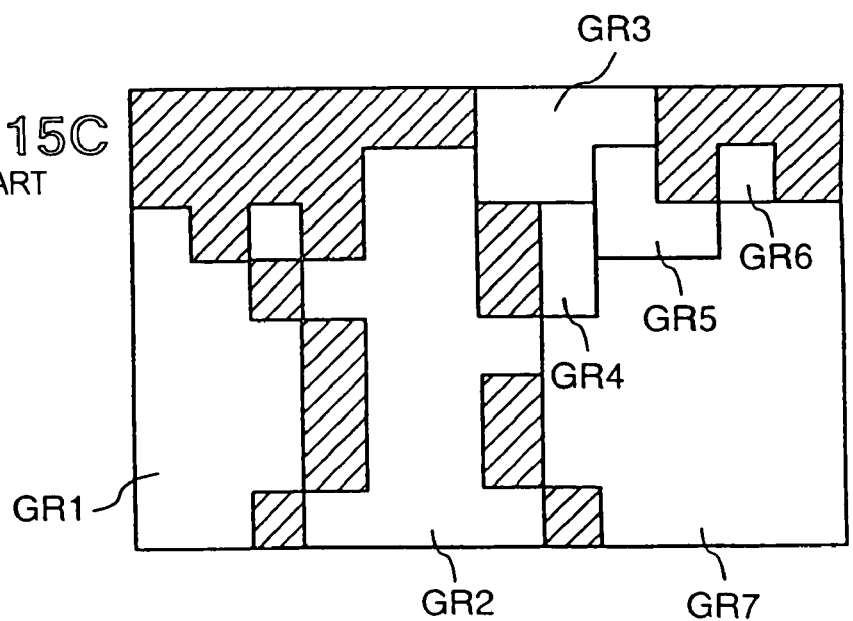

OPTICAL DEVICE AND METHOD FOR SELECTING OBJECT OF FOCUS

BACKGROUND OF THE INVENTION

The present invention relates to an optical device, such as an automatic focusing camera and a monitor camera, having an automatic focusing function.

Various techniques for measuring distances to objects which are in different directions using an optical device are known. One of these techniques is disclosed in the Japanese Patent Publication No. 4-67607. Further, a plurality of techniques for estimating an area, in the object space, which includes a main object on the basis of distance distribution information of the objects obtained by using the techniques for measuring distances to the objects are disclosed.

Below, a typical conventional method of estimating an area which includes a main object is explained with reference to FIGS. 15A to 15C.

First, a scene, such as the one shown in FIG. 15A, is sensed by using a pair of image sensing devices, such as CCDs, arranged inside of an optical device, such as a camera, at a predetermined distance from each other. Two images, sensed by the pair of image sensing devices, which have parallax are respectively divided into M×n blocks. Then, by performing known correlation operation between signals of a given block of one of the two images and signals of the corresponding block of the other image, it is possible to obtain the distance to an object and/or a defocused amount of the block based on trigonometry principle. The correlation operation is performed on every block, and distance distribution information of M×n blocks as shown in FIG. 15B is obtained. The numerals in FIG. 15B denote distance values or defocused values. The blank blocks are where it is determined that reliability of the result of correlation operation performed on these blocks is low due to low contrast of image signals, for instance.

Next, grouping of blocks is performed in order to separate objects, in the object space, on the sensed images. After grouping, the M×n blocks are combined into areas each includes each object as shown in FIG. 15C. Note that the hatched portions in FIG. 15C correspond to the blank blocks in FIG. 15B and are determined that reliability of the result of correlation operation in these areas is low due to low contrast of image signals, for instance.

As for a method of grouping, there is a method of determining similarity of adjoining blocks by, e.g., comparing the values of the adjoining blocks shown in FIG. 15B, and determining that the adjoining blocks are composed of the same object if the similarity is high, whereas, determining that they are composed of different objects if the similarity is low. Note, when the images are divided into relatively large blocks, as shown in FIG. 15B, the distance distribution information to be used for the grouping is simple values, such as distance values or defocused values; however, in a case where the block is very small, fine distance distribution information can be obtained, the information is often vectors normal to surfaces.

For example, a distance value of a given block as shown in FIG. 15B is compared to respective distance values of its adjoining blocks, and if the difference between the distance values of the adjoining two blocks is within a predetermined threshold, then it is determined that "the objects in the blocks compose the same object". Whereas, if the distance is greater than the threshold, then it is determined that "the object in the blocks compose different objects." By performing the aforesaid determination on every block, blocks are grouped into common objects. The grouped blocks which compose each object are dealt with as a group.

Thereafter, characteristics of each group in the image are evaluated, and the group which includes the main object is determined out of all the groups.

In a case of the groups as shown in FIG. 15C, characteristics, such as average distances to the objects, widths, heights, and positions of the groups in the frame, are obtained for all the groups GR1 to GR7, and evaluated as a whole, thereby determining the group which is considered to include the main object. For example, likelihood (possibility) of the group having the main object is obtained using a predetermined function, such as the following equation 1, then the obtained values are evaluated.

$$\text{(possibility)} = W1 \times (\text{width}) \times (\text{height}) + W2/(\text{distance from the center of frame}) + W3/(\text{average distance}) \quad (1)$$

In the equation 1, W1, W2, and W3 are constants for weighting items, "distance from the center of frame" is the distance between the center of the frame and the center of mass of the group, and "average distance" is an average of distances to the object from the camera in all the blocks of each group. The probability is calculated for every group, and the group having the largest probability is determined as including the main object.

Thereafter, a focal length is determined on the basis of the distance information of the group, determined as including the main object, so as to focus on an object in the group, then the lens is actually moved to focus on the object.

In the conventional focusing function as described above, an area including the main object is automatically determined on the basis of the aforesaid information, for instance, and focus control is performed on the basis of the determined result.

However, there are a variety of scenes to be sensed and a variety of objects to be the main object; therefore, the main object which the user actually intends to focus on is not always correctly determined as the main object in the aforesaid method.

Furthermore, an increase in the distance measuring points and areas caused by an increase in the number pixels of the CCDs complicates the determination of main object, which increases difficulty to focus on the main object completely automatically. However, since full-manual-selection of, selecting the main object also complicates operation of a camera, it is desirable to realize unification of automatic control and manual control to a high degree.

SUMMARY OF THE INVENTION

The present invention has been made in consideration of the above situation, and has as its object to provide an optical device and method for selecting a distance measurement point capable of correctly selecting an object which an operator intends to focus on, and focusing on the selected object.

According to the present invention, the foregoing object is attained by providing an optical device comprising: area discrimination means for discriminating a plurality of areas in a sensed image on the basis of a predetermined condition; main object area determination means for determining a main object area out of the plurality of areas discriminated by the area discrimination means; main object area changing means for changing the main object area to another area; and focus control means for focusing on the main object area.

Further, the foregoing object is also attained by providing an distance measuring point selection method comprising: an area discrimination step of discriminating a plurality of areas in a sensed image on the basis of a predetermined condition; a main object area determination step of determining a main object area out of the plurality of areas discriminated in the area discrimination step; a main object area changing step of changing the main object area to another area; a change instruction detection means of detecting whether or not there is any instruction to change the main object area; a control step of controlling to disable the main object area changing step when it is determined that there is no instruction to change the main object area in the change designation determination step; and a focus control step of focusing on the main object area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 15A to 15C are explanatory views for explaining the conventional distance measuring operation.

DETAILED DESCRIPTION OF THE PREFERRED EMBODIMENTS

Preferred embodiment of the present invention will be described in detail in accordance with the accompanying drawings.

First Embodiment

Taking a function of selecting a distance measurement point of an automatic focusing camera as an example, a system capable of arbitrary changing a main object area from an area, obtained as a result of automatic main object area selection, to another area using a single axis rotary operation member (dial) is explained.

Figure 1:
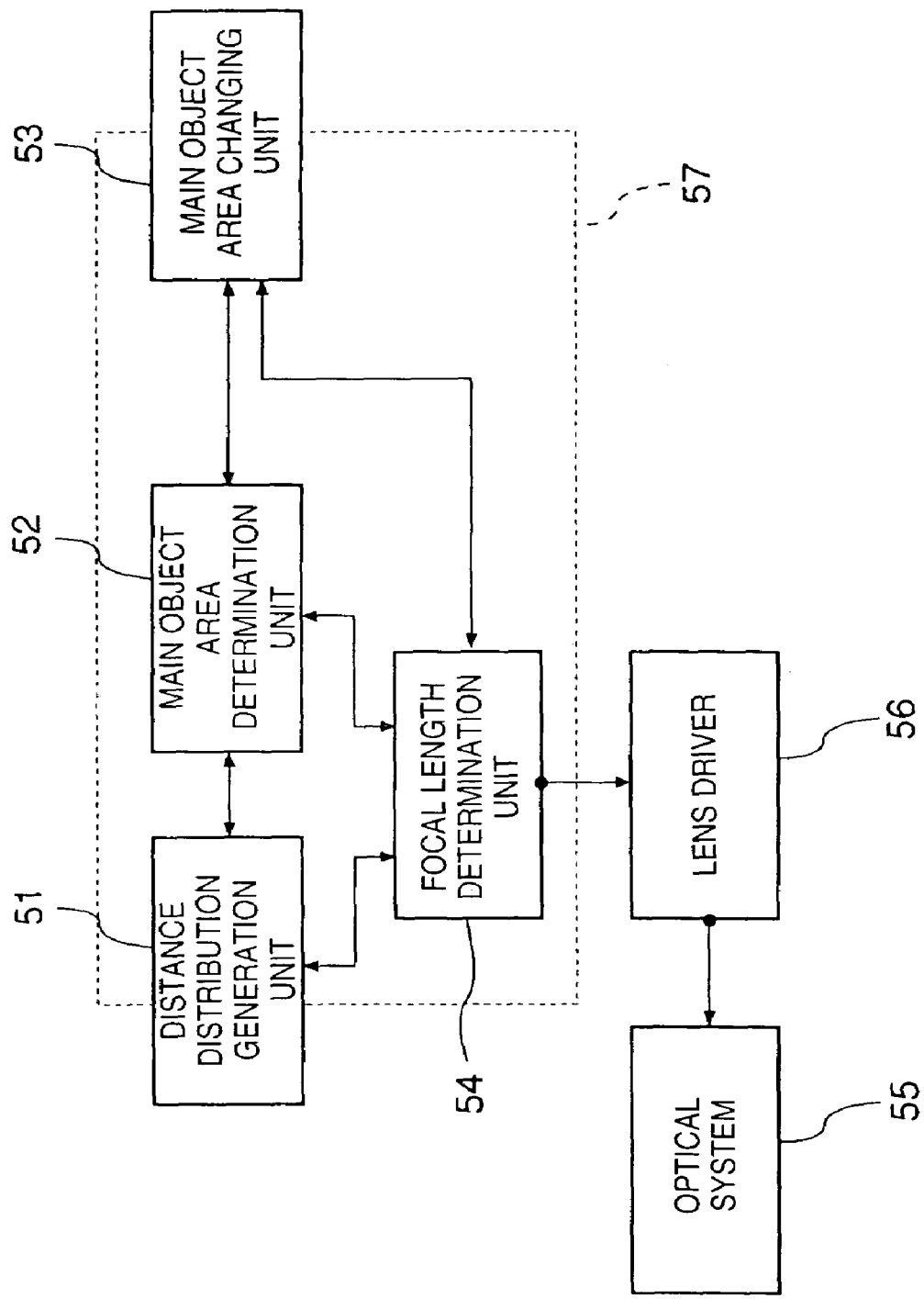
FIG. 1 is a block diagram illustrating a basic configuration of a camera according to a first embodiment of the present invention.

FIG. 1 is a block diagram showing basic elements of a camera according to the first embodiment of the present invention. In FIG. 1, reference numeral 51 denotes a distance distribution generation unit for measuring the distance to an arbitrary point in the object space; 52, a main object area determination unit for determining an area which most probably includes the main object (referred to as "main object area" hereinafter) in the sensed image; 53, a main object area changing unit for changing the main object area, determined automatically, to another area in response to a manual input; 54, a focal length determination unit for determining a control value to control the focus point of an optical system 55 on the basis of information on the determined main object area; 55, the optical system for sensing an image; and 56, a lens driver for driving the lens to focus. A dot line 57 is for indicating units which are realized by a CPU, RAM and ROM of a computer. Since the distance distribution generation unit 51 is realized with the computer and an optical system for distance measurement, and the main object area changing unit 53 is realized with the computer and an operation member, these units are shown on the dot line 57.

A configuration of an optical system used for generating distance distribution information is explained below.

Figure 2:
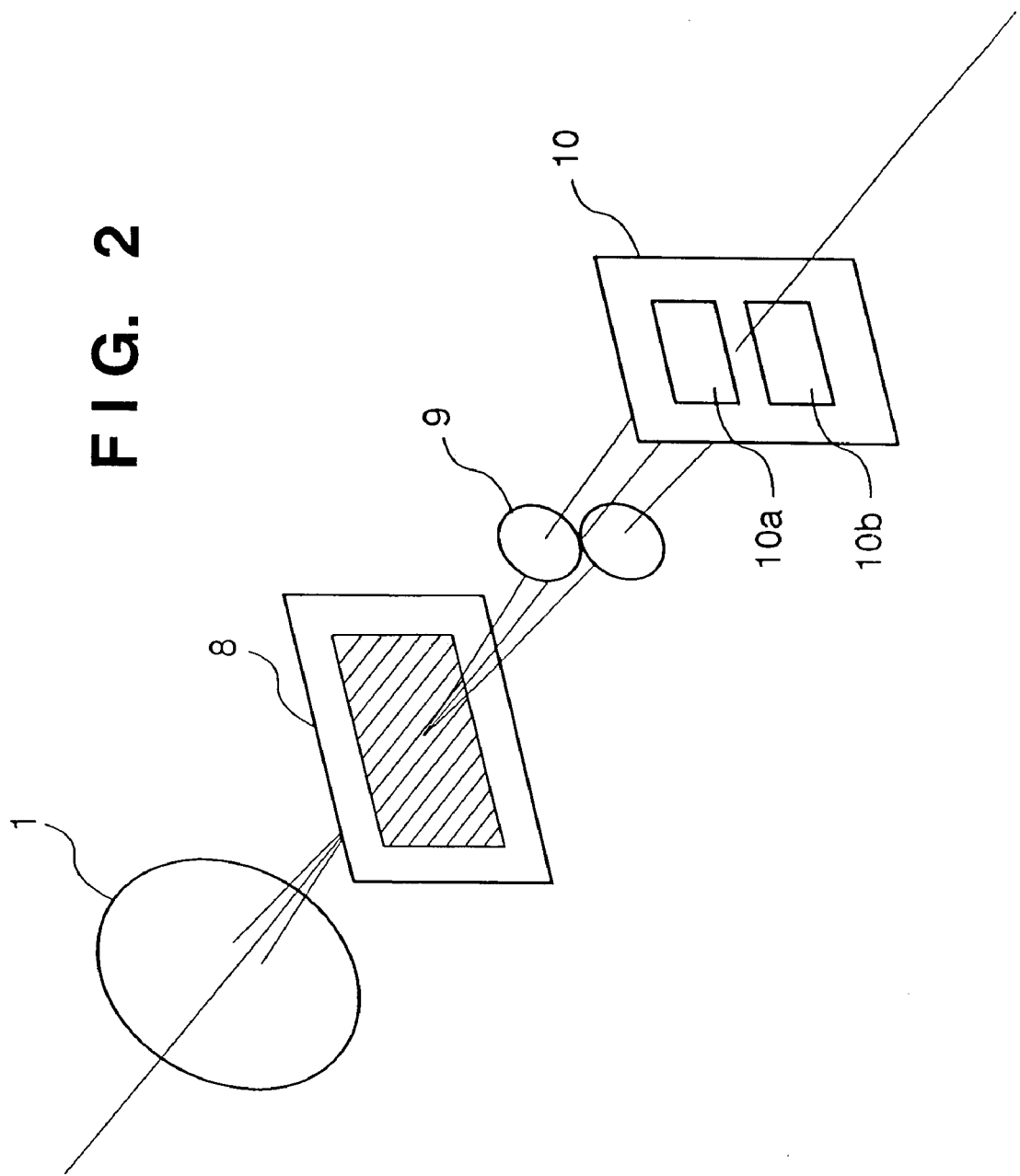
FIG. 2 shows an optical arrangement of basic optical elements of the camera according to the first embodiment of the present invention.

FIG. 2 shows an optical arrangement of optical elements, of the camera, for measuring the distance to a point in the object space. In FIG. 2, reference numeral 1 denotes an image sensing lens; 8, a field lens; 9, secondary focusing lenses; and 10, an area sensor. Fluxes, introduced by the image sensing lens 1 through different positions, incident on two image forming areas 10a and 10b of the area sensor 10 in the magnification determined by the powers of the field lens 8 and the secondary focusing lenses 9. The area sensor 10 is arranged on a conjugate plane of a film to be exposed with respect to the image sensing lens 1, and all or a part of an image to be sensed is formed on each of the image forming areas 10a and 10b.

Figure 3:
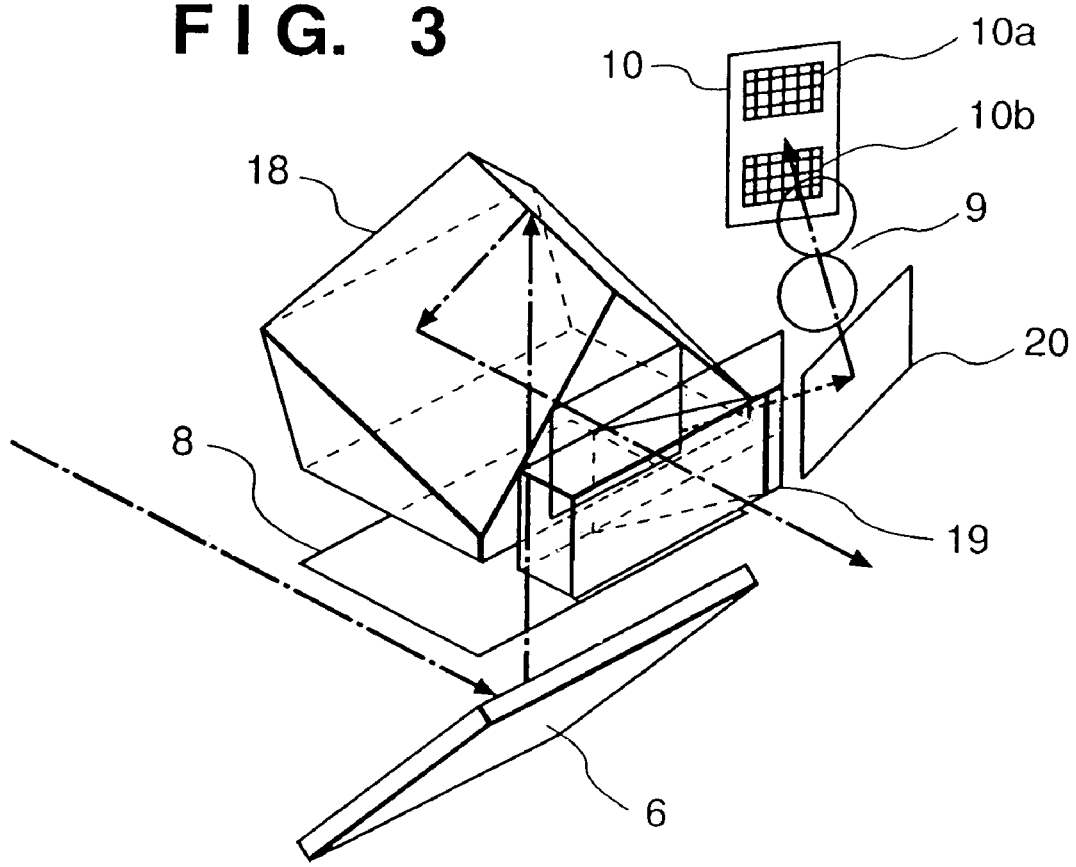
FIG. 3 is a perspective view showing an arrangement of the optical elements of the camera according to the first embodiment of the present invention.

FIG. 3 is a perspective view showing an arrangement of the optical system for measuring the distance, shown in FIG. 2, when it is applied to the camera. Referring to FIG. 3, reference numeral 6 denotes a quick return mirror; 18, a pentaprism; 19, a light-splitting prism; and 20, a full-reflection mirror. Other reference numerals in FIG. 3 are same as those explained with reference to FIG. 2.

Figure 4:
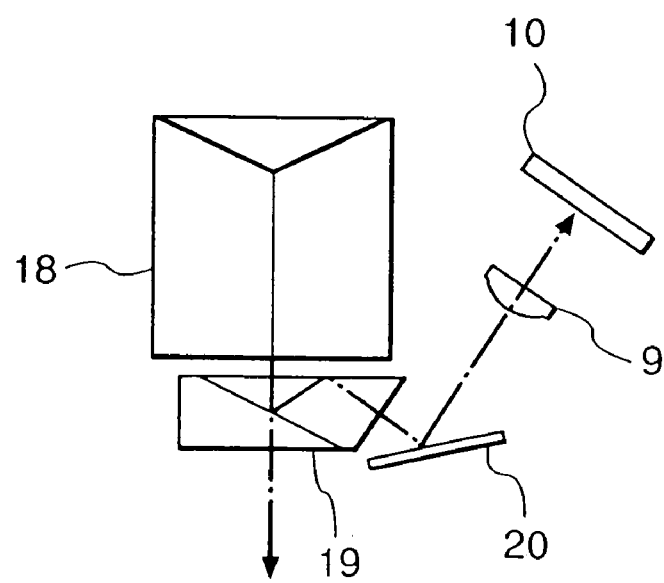
FIG. 4 is a top view showing the arrangement of the optical elements of the camera according to the first embodiment of the present invention.

FIG. 4 is a top view when the arrangement shown in FIG. 3 is overlooked from above.

Using an optical system as described above, two images having predetermined parallax are obtained.

Note, a camera having the aforesaid configuration is disclosed in detail in the Japanese Patent Application Laid-Open No. 7-134238.

Figure 5:
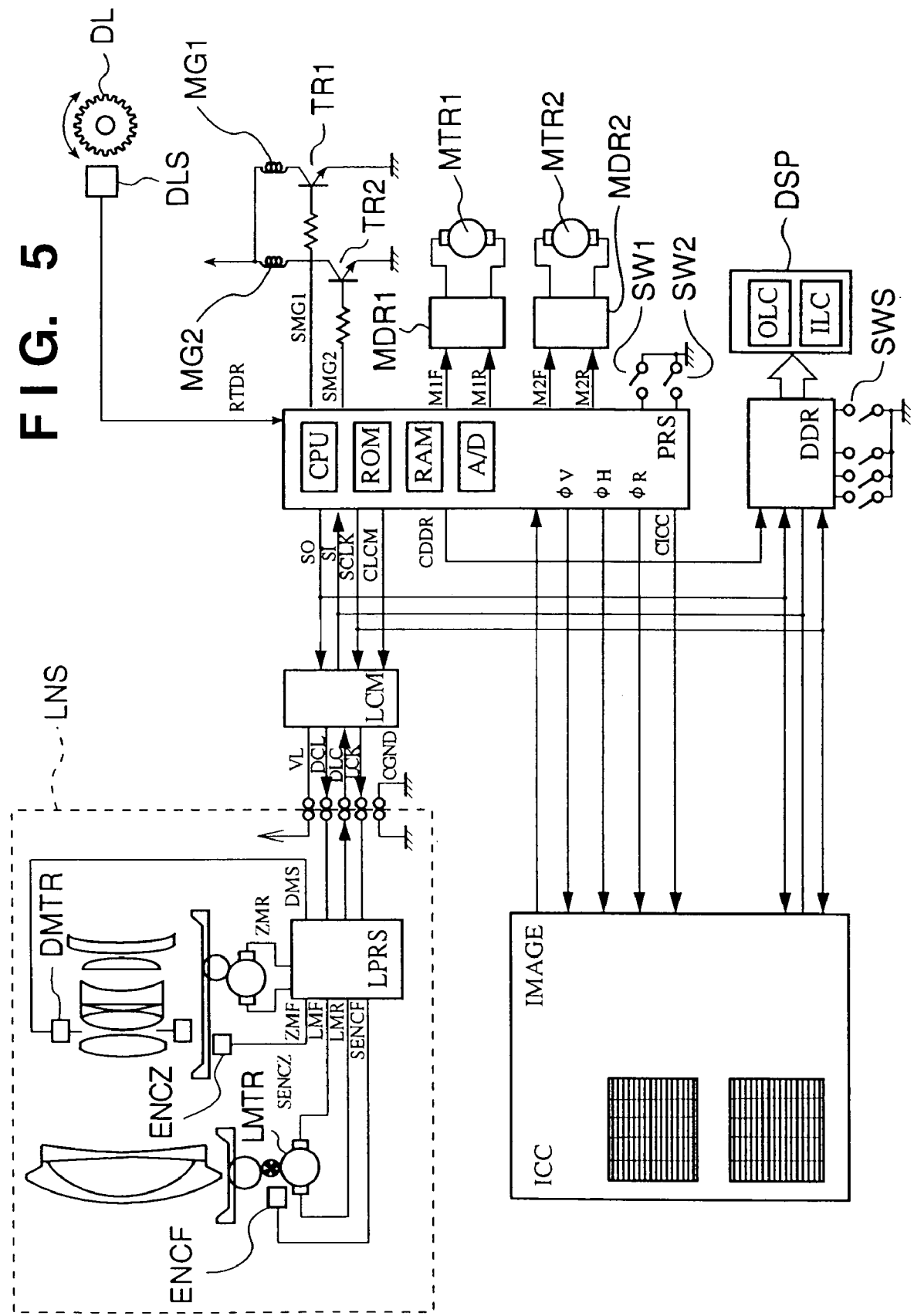
FIG. 5 is a diagram illustrating an internal configuration of the camera.

FIG. 5 is a circuit diagram illustrating a configuration of the camera having the aforesaid optical system. First, each unit is explained.

In FIG. 5, PRS denotes a camera controller, which may be a one-chip microcomputer having a CPU, ROM, RAM, and analog-digital converter. The camera controller PRS performs a series of operations of the camera, such as automatic exposure control, automatic focus control, and advancing and rewinding of a film, on the basis of sequence program stored in the ROM. Thus, the camera controller PRS communicates with inside circuits of the camera and a lens control unit using communication signals SO and SI, a synchronizing clock SCLK, and communication selection signals CLCM, CDDR and CICC, to control operation of each circuit and lens.

Regarding communication signals, SO is a data signal outputted from the camera controller PRS, SI is a data signal inputted to the camera controller PRS, and SCLK is a synchronizing clock for signals SO and SI.

Further, in FIG. 5, reference LCM denotes a lens communication buffer circuit, and it supplies electric power to a power input terminal VL for the lens when the camera is under operation, further, when the selection signal CLCM from the camera controller PRS is in high potential level (referred as "H", and low potential level is referred as "L", hereinafter), it acts as a communication buffer between the camera controller PRS and the lens.

When the camera controller PRS controls the selection signal CLCM to be "H" and outputs predetermined data, such as the data signal SO, in synchronization with the synchronizing clock SCLK, the lens communication buffer circuit LCM outputs buffer signals LCK and DCL corresponding to the synchronizing clock SCLK and the data signal LO, respectively, to the lens via a communication node between the camera controller PRS and the lens. At the same time, a buffer signal of the signal DLC is outputted from a lens unit LNS as the data signal SI, and the camera controller PRS receives data of the lens as the data signal SI in synchronization with the synchronizing clock SCLK.

Reference DDR denotes a circuit for detecting operation of various switches SWS and for display. It is selected when the signal CDDR is "H", and controlled by the camera controller PRS by using the data signals SO and SI, and the synchronizing clock SCLK. More specifically, the circuit DDR changes the displayed contents on a display member DSP of the camera on the basis of data sent from the camera controller PRS, and notifies the camera controller PRS of the ON/OFF state of each of the operation switches SWS of the camera. The state of the rotary operation member of the main object area changing unit 53 is also detected by the circuit DDR.

Reference OLC denotes an outside liquid crystal display provided in the upper portion of the camera, and reference ILC denotes a liquid crystal display inside of a finder.

Switches SW1 and SW2 are coupled with a shutter release button (not shown), and with a half press of the shutter release button, the switch SW1 is turned on, and with a full press of the shutter release button, the switch SW2 is turned on. The camera controller PRS performs photometry and automatic focus adjustment in response to the "on" operation of the switch SW1, and in response to the "on" operation of the switch SW2, it controls exposure, thereafter, advances the film one frame.

Note, the switch SW2 is connected to an interruption input terminal of the camera controller PRS, and even when programs triggered by the "on" operation of the switch SW1 is under execution, the "on" operation of the switch SW2 interrupts the execution, and the camera controller PRS swiftly moves to a predetermined interrupt program.

Reference MTR1 denotes a motor for advancing the film, and reference MTR2 denotes a motor for moving a mirror in the up and down direction and charging of a shutter spring, and the film and the mirror are controlled to move in the forward and reverse directions by the motors MDR1 and MDR2, respectively. Signals M1F, M1R, M2F and M2R, inputted from the camera controller PRS to driving circuits MDR1 and MDR2, are forward and reverse rotation control signals.

References MG1 and MG2 denote front and rear curtain operation magnets, which are supplied with electric power via amplifying transistors TR1 and TR2 in response to control signals SMG1 and SMG2, and the shutter is controlled by the camera controller PRS. Note, the motor driving circuits MDR1 and MDR2 and shutter control are not directly related to the present invention, therefore, detailed explanation of them are omitted.

A buffer signal DCL which is inputted to the lens controller LPRS in synchronization with the buffer signal LCK is instruction data from the camera controller PRS to the lens unit LNS, and operation of the lens unit LNS corresponding to each instruction is predetermined. The lens controller LPRS analyzes the instruction in a predetermined procedure, and outputs operation states of focusing control, iris diaphragm control, the output signal DLC, each element of the lens unit LNS (e.g., operation states of focusing control optical system and operation states of iris diaphragm), and various parameters (open f-number, focus distance, coefficient of amount of movement of focusing control optical system corresponding to defocus amount, various focus correction amounts, etc.)

A zoom lens is explained in the first embodiment as an example, and when an instruction for focus adjustment is transmitted from the camera controller PRS, a motor LMTR for focus adjustment is operated on the basis of the signals LMF and LMR showing an amount and direction of displacement which are transmitted simultaneously. Accordingly, focus adjustment is performed by either rotating the optical system in the forward or reverse direction along the optical axis. The amount of displacement of the optical system is obtained in the following manner. First, a pattern of a pulse board, which rotates, coupled with the optical system, is detected by a photocoupler, monitoring a pulse signal SENCF outputted from an encoder ENCF which outputs pulses whose number corresponds to the displacement amount. The number of the pulses SENCF is counted by a counter (not shown) provided inside of the lens controller LPRS. When the optical system finishes moving by a calculated amount, then the lens controller LPRS controls the signals LMF and LMR to "L" to operate the motor LMTR.

Therefore, after an instruction for focus adjustment is transmitted from the camera controller PRS, the camera controller PRS does not care about operation of the lens until the lens finishes displacement. Further, the lens controller LPRS transmits the value of the counter to the camera controller PRS when the camera controller PRS requests to do so.

When an instruction for controlling the iris diaphragm is transmitted from the camera controller PRS, a stepping motor DMTR, which is known for driving an iris diaphragm, is operated based on an iris diaphragm stage number transmitted at the same time. Note, since the stepping motor DMTR can control the opening of the iris diaphragm, an encoder for monitoring the operation is not necessary.

Reference ENCZ denotes an encoder attached to a zoom optical system, and the lens controller LPRS detects the zoom position by receiving a signal SENCZ from the encoder ENCZ. The lens controller LPRS stores lens parameters corresponding to respective zoom positions, and outputs a parameter corresponding to a current zoom position to the camera controller PRS when the camera controller PRS requests to do so.

Reference ICC denotes an area sensor unit including area sensors, such as CCDs, and an operation circuit for operating the area sensors, which is used for focus state detection and photometry. The area sensor unit ICC is selected when the selection signal CICC is "H", and controlled by the camera controller PRS using the data signals SO and SI, and the synchronizing clock SCLK.

$\phi V$ and $\phi H$ are read signals for the area sensors, and $\phi R$ is a reset signal. These sensor signals are generated by a driving circuit provided inside of the area sensor unit ICC on the basis of signals from the microcomputer PRS. The signals outputted from the area sensors are amplified, then inputted into an analog signal input terminal of the microcomputer PRS as output signals IMAGE. Thereafter, the microcomputer PRS converts the analog output signals IMAGE into digital signals, and the values of the digital signals are sequentially stored in the RAM at predetermined addresses. With these digitized signals, to generate distance distribution information in the object space, focus control, or photometry is performed.

Reference DL denotes a rotary operation member, which is used for indicating the direction to change the main object area, which will be explained later. Further, reference DLS denotes a sensor for detecting the rotated direction of the rotary operation member DL, which outputs a signal RTDR indicating the detected direction to the camera controller PRS.

Note that the camera body and the lens are described detachable (i.e., lenses are exchangeable) in FIG. 5; however, the present invention is not limited to the camera of this type. For example, it is possible to apply the present invention to a camera whose camera body and lens are integrally composed.

Below, a detailed operation and overall flow of the operation of the camera having the aforesaid configuration are explained with reference to FIGS. 6 to 12.

Figure 6:
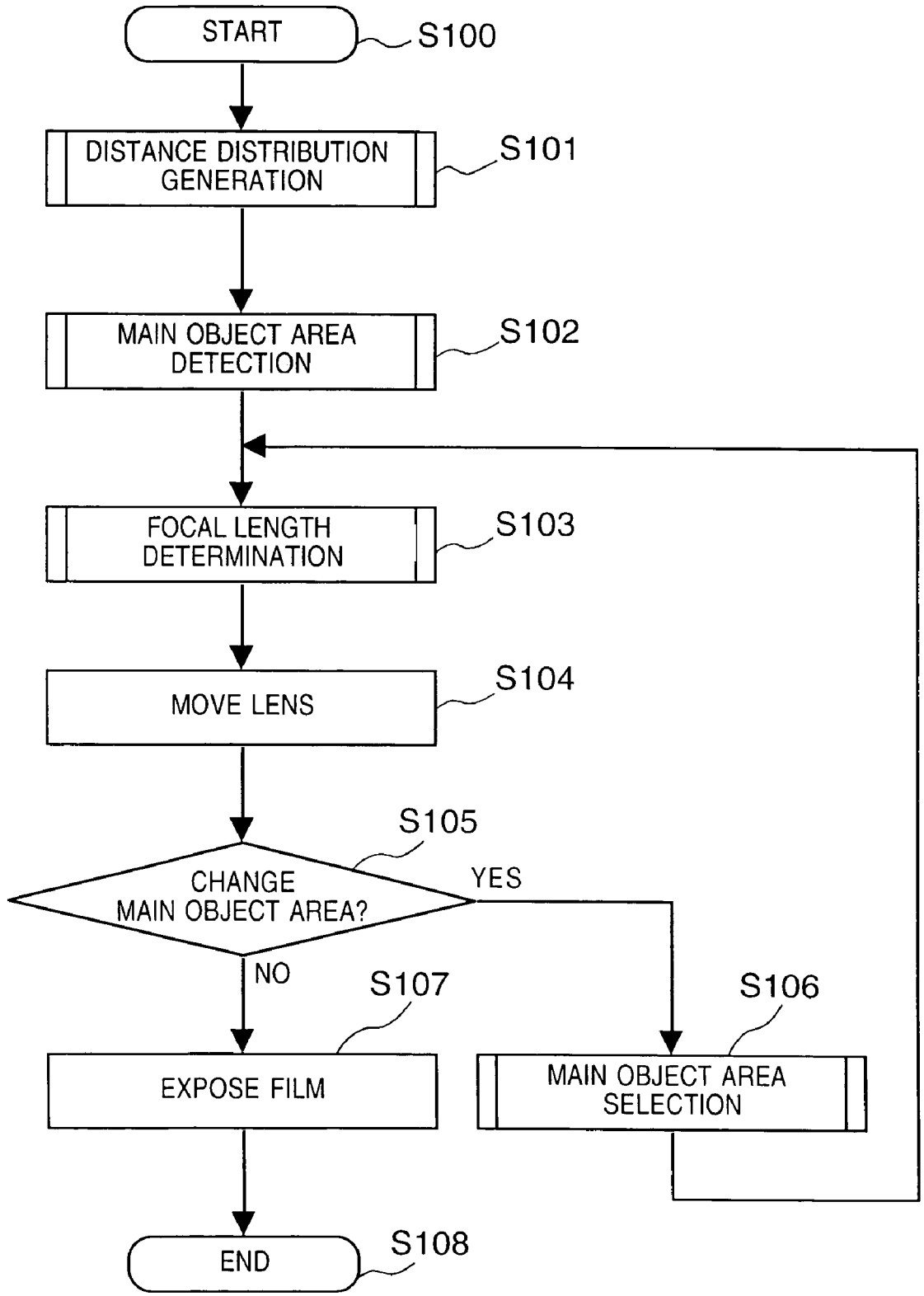
FIG. 6 is a flowchart showing a basic operation according to the first embodiment of the present invention.

First, referring to FIG. 6, an image sensing operation starts in step S100 when an operator presses a shutter release button (not shown), for instance.

Next in step S101, a sub-routine for generating distance distribution information (distance distribution generation processing) in the object space is called by the distance distribution generation unit 51.

Figure 7:
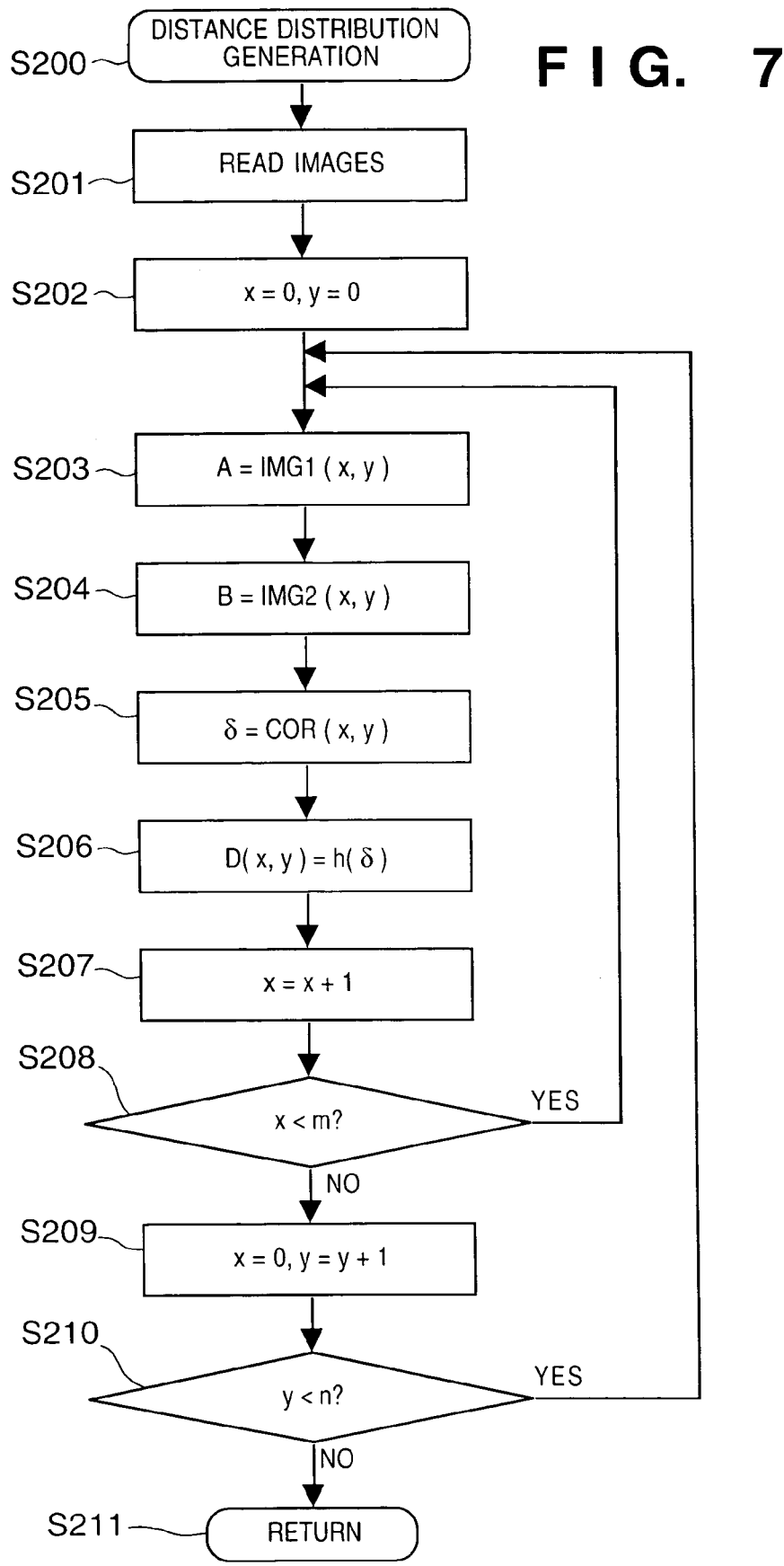
FIG. 7 is a flowchart of distance distribution generation processing according to the first embodiment of the present invention.

FIG. 7 is a flowchart showing the distance distribution generation processing.

In step S201 in FIG. 7, images are read from the area sensors. The image are read in the following manner. First, the area sensors are reset. More specifically, by controlling the control signals $\phi V$, $\phi H$ and $\phi R$ to be "H" simultaneously for a predetermined period, residual charges are drained and the area sensor is reset.

Next, the camera controller PRS transmits an instruction to start charging, and accumulation of charges starts in response to the instruction. After a predetermined period elapses, the accumulation of charges ends.

Thereafter, the control signals $\phi V$ and $\phi H$ are controlled to drive the area sensors to sequentially output image signals IMAGE, which are A/D converted and stored in RAM in the camera controller PRS. Accordingly, image reading operation in step S201 is completed.

The output image signals from the two area sensors are stored as IMG1 and IMG2 in a predetermined area of the RAM.

Next, each of the images IMG1 and IMG2 obtained from the two area sensors is divided into M×n blocks and defocus distribution (defocus map) is generated in step S202 and its subsequent steps.

First in step S202, variables x and y, which are for indicating a block, are initialized. Next in step S203, luminance signals necessary for performing distance measuring operation for a block B(x, y), i.e., luminance signals of the block obtained from one of the area sensors, are extracted from the image data IMG1 stored in the RAM, and copied in the RAM at predetermined addresses A.

In step S204, luminance signals necessary for performing distance measuring operation for the block B(x, y) are extracted from the image data IMG2, and copied in the RAM at predetermined addresses B.

In step S205, a known correlation operation COR(x, y) is performed on the luminance signals (luminance distribution signals) recorded at the addresses A and B, and a phase difference between the two luminance distributions is calculated.

Thereafter, in step S206, a distance value or a defocused amount is obtained using any known function F( ) on the basis of the phase difference between luminance distributions calculated in step S205, and stored in the RAM at an address D(x, y) which is reserved for recording distance distribution information.

In step S207, the variable x is increased by 1 to move a block to be processed to the next block.

In step S208, x and the division number M in the x direction are compared, and if it is determined in step S208 that x is less than M, then the process returns to step S203, and a distance value or a defocused amount of the next block in the x direction is calculated and stored. If it is determined in step S208 that x is equal to or greater than M, then the process moves to step S209, where x is initialized to 0 and y is increased by 1.

In step S210, y and the division number n in the y direction are compared, and if it is determined that y is less than n, then the process returns to step S203 and the operation for the next row starts. Whereas, if it is determined that y is equal to or greater than n, then the process proceeds to step S211, where operation for obtaining a distance value or a defocused amount of every block has been completed. Accordingly, the distance distribution generation sub-routine of step S101 in FIG. 6 is completed.

Next, in step S102, a sub-routine for detecting a main object area (main object area detection processing) is called by the main object area determination unit 52. The contents of the main object area detection sub-routine are explained with reference to FIG. 8.

Figure 8:
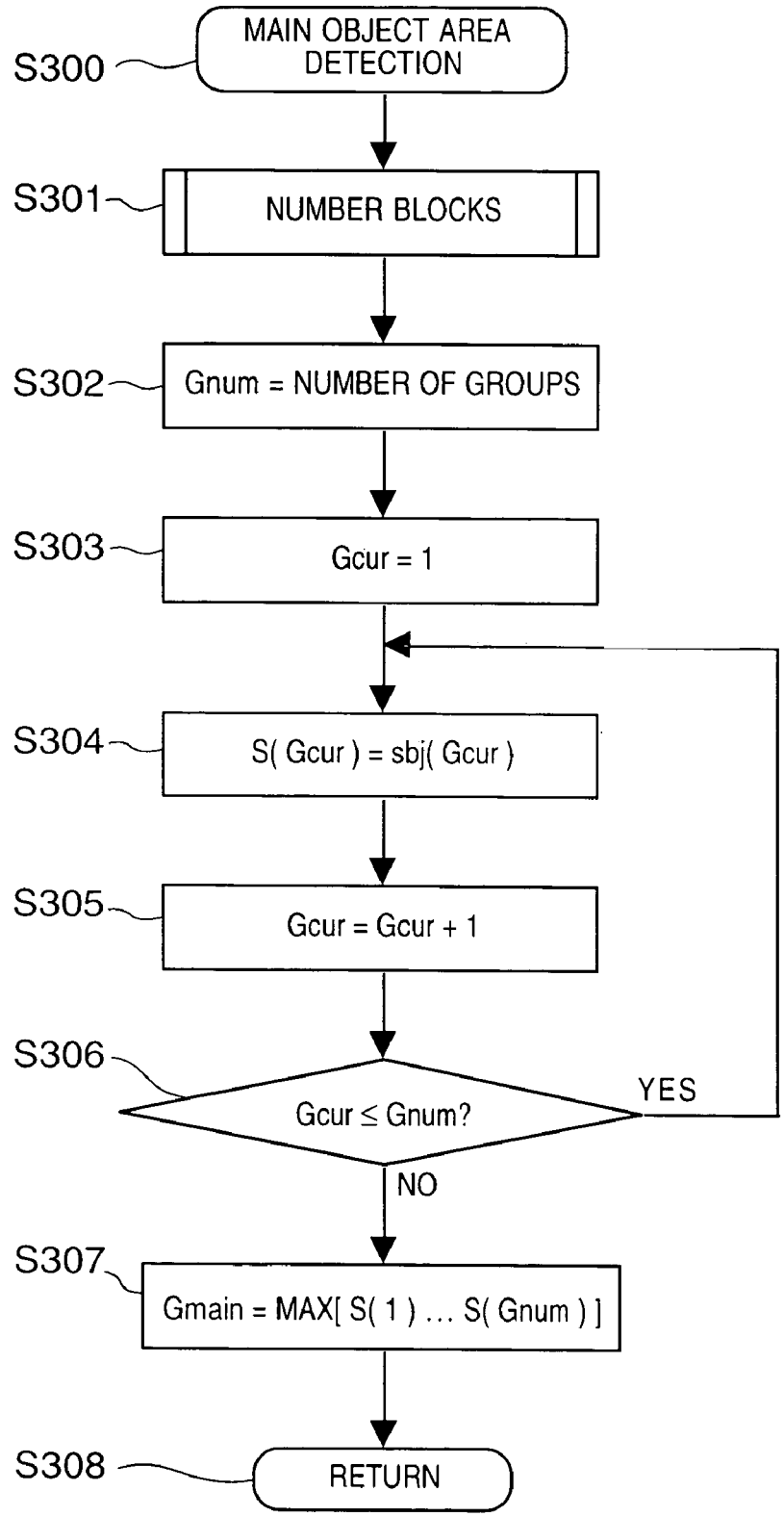
FIG. 8 is a flowchart of main object area detection processing according to the first embodiment of the present invention.

In step S301 in FIG. 8, operation for numbering respective objects (groups), configuring the object space, is performed.

Figure 11:
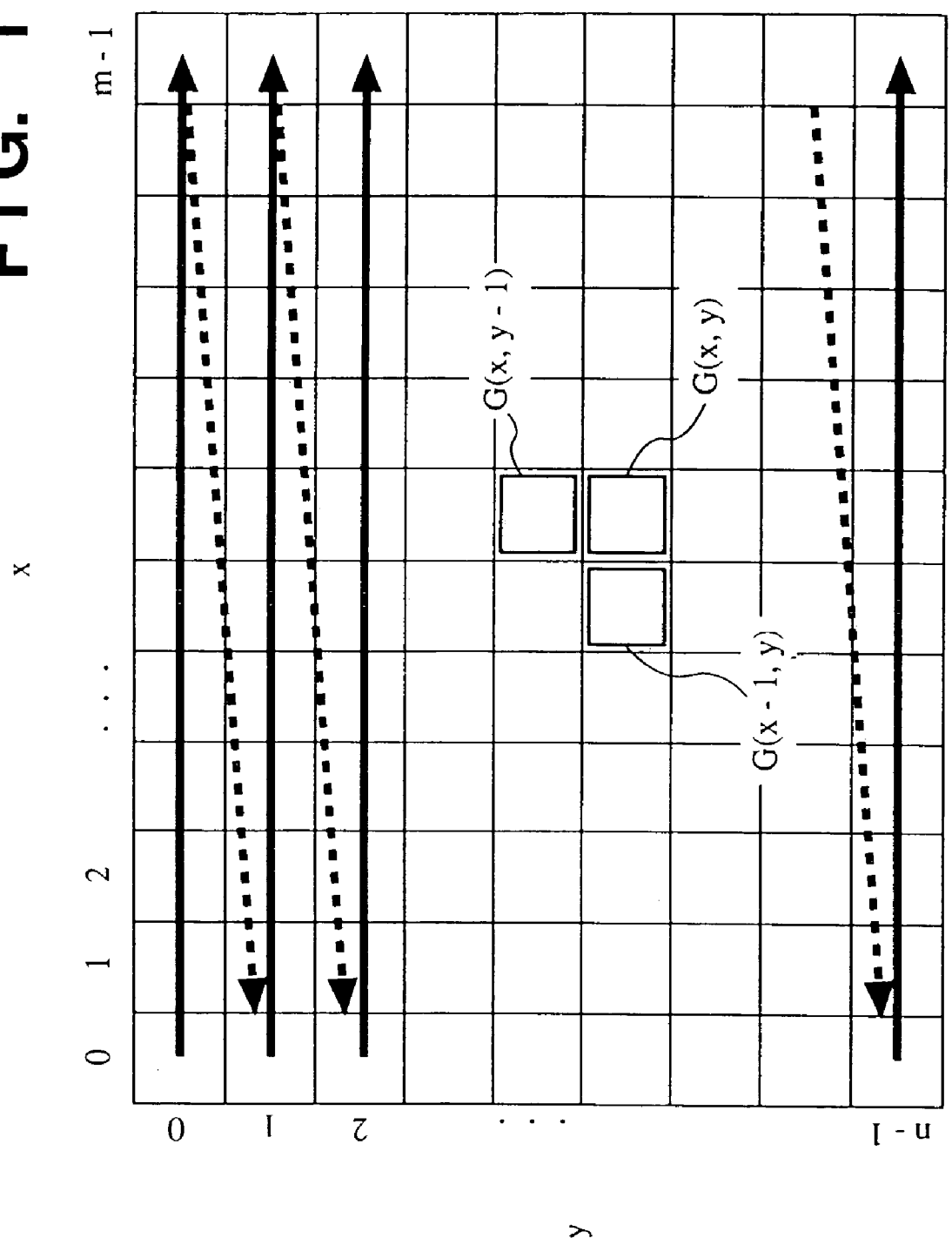
FIG. 11 is an explanatory view of a method for dividing an image into a plurality of areas.

In a case of numbering (grouping) the blocks while performing raster scanning in the direction of an arrow from the left-uppermost block in FIG. 11, for instance, a determination whether or not a block of interest B(x, y) and its upper block B(x, y−1) belong to the same group and a determination whether or not the block of interest B(x, y)

and its left block B(x−1, y) belong to the same group are performed. Eventually, determination whether or not a given block and its adjoining blocks belong to the same block is performed on every block. In this case, blocks in the uppermost row (y=0) and the leftmost column (x=0) does not have upper blocks and left blocks, respectively; therefore, determination between the blocks in the uppermost row and their upper blocks, and between the left most column and their left blocks are not performed.

Figures 12A, 12B:
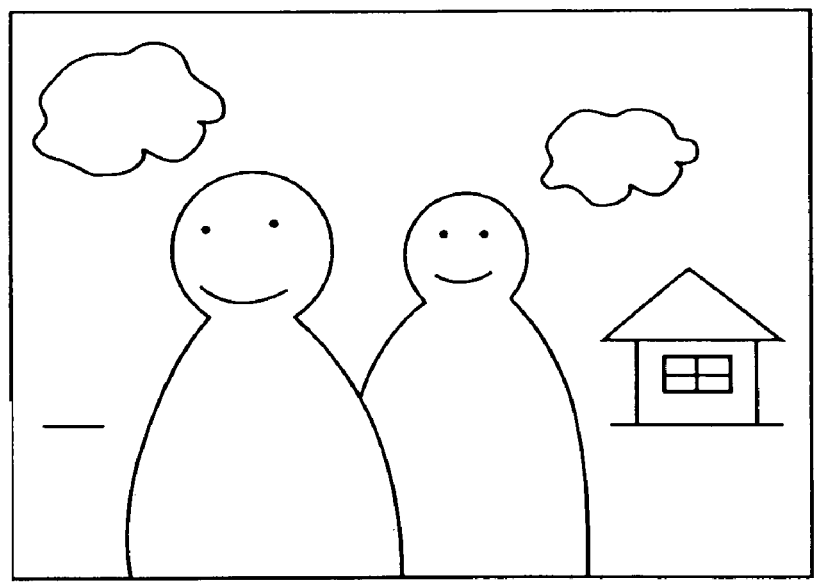
FIG. 12A shows an example of an image sensed by the camera.
FIG. 12B shows a result of labeling of the image shown in FIG. 12A.

Further, the results of determination are stored in the RAM at reserved addresses G(0, 0) to G(M−1, n−1). First, the block B(x, y)=B(0, 0) is registered with a group number g=1. Whenever a new group which composes another object is detected, the group number is increased by 1 and the increased number becomes the group number of the new group. With this operation, respective blocks of the sensed image as shown in FIG. 12A are labeled group numbers for respective groups as shown in FIG. 12B.

The numbering processing as described above is a known technique called "labeling method", and a flowchart of grouping of the blocks is omitted. Further determination method of determining whether or not two blocks belong to an identical group is disclosed in the Japanese Patent Laid-Open Application No. 10-161013; accordingly, detailed explanation of the method is omitted.

The number of groups detected in step S301 is set to a variable Gnum in step S302.

In step S303 and its subsequent steps, characteristics of each group forming the sensed image are evaluated, and a group which most probably includes a main object (main object area) is determined out of all the groups (object areas) on the basis of the evaluated characteristics. First in step S303, a variable Gcur which denotes a group to be processed is set to 1.

In step S304, a likelihood (probability), S(Gcur), of a block or blocks, forming a group Gcur, of including a main object is calculated. The probability S(Gcur) is determined on the basis of an average distance to an object included in the group, width and height of the group, and the location of the group in the image. A group which is considered to include the main object is determined on the basis of the calculated probabilities of all the groups. As for a function of calculating the possibility S(Gcur), the equation 1, described above, may be used.

In step S305, the value of Gcur is increased by 1, and the group subjected to the operation is proceeded to the next group.

In step S306, Gcur and Gnum are compared to check whether or not the operation has been performed on all the groups. If Gcur is equal to or less than Gnum, then all the groups have not been processed; therefore, the process returns to step S304. Whereas, if Gcur is greater then Gnum, then the process proceeds to step S307.

In step S307, using a function MAX, a group number having the maximum probability among the probabilities S(1) to S(Gnum) is found, and the group number having the greatest probability substitutes a variable Gmain. The blocks labeled the same group number as Gmain are determined as forming the main object area.

In step S308, the main object area detection processing is completed; thus step S102 in FIG. 6 is finished.

Thereafter, the process proceeds to step S103 in FIG. 6, where a process of determining a focal length (focal length determination processing) is performed by the focal length determination unit 54. Here, a sub-routine for determining a focal length on the basis of information on the main object area is executed. The focal length determination processing is explained with reference to FIG. 9.

Figure 9:
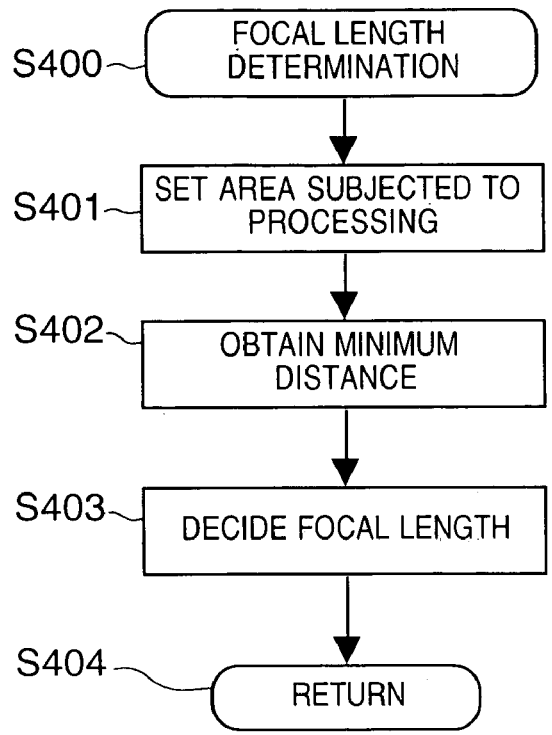
FIG. 9 is a flowchart of focal length determination processing according to the first embodiment of the present invention.

In step S401 in FIG. 9, an area, in the object space, subjected to the focal length determination processing is set to the main object area on the basis of the group number detected in step S102.

In the subsequent step S402, distance information for focus adjustment is calculated on the basis of information on the main object area set in step S102. Here, an algorithm which gives priority to the minimum distance in the object area is used, and the minimum distance to the object in the area is calculated.

Thereafter, in step S403, the minimum distance is set as the distance to an object to be focused on; thereby the focal length determination processing is completed, and the process returns to the flowchart in FIG. 6.

After the operation of steps S101 to S103, performed in the camera controller PRS, an instruction to control focus is transmitted to the lens from the camera controller PRS so as to focus on a point at the distance determined in step S103, and the lens controller LPRS controls the motor LMTR to focus on the object which is currently considered as the main object in step S104.

Next in step S105, whether or not the current focus state is proper, namely, whether the main object area which is currently selected includes the main object which the operator intends to focus on, is determined. In the first embodiment, whether or not the operator wishes to change the main object area is checked by detecting a state of the rotary operation member of the main object area changing unit 53 or a state of the switch SW2 of the shutter release button which trigger image sensing operation. More specifically, if the rotary operation member of the main object area changing unit 53 is operated before the switch SW2 of the shutter release button is turned on, then it is determined that the operator wishes to change the main object area, whereas, if the switch SW2 is turned on before detecting any operation of the rotary operation member, then it is determined that the operator is satisfied with the main object which is currently set.

First, in a case of leaving the main object area unchanged, control signals SMG1 and SMG2 to the respective front and rear curtain operation magnets MG1 and MG2 are generated at proper intervals by the camera controller PRS in step S107, the film is exposed, and the image sensing operation is completed.

Whereas, if a change in main object area is requested in step S105, then the process proceeds to step S106, where the process of selecting a main-object area is performed.

The main object area selection process is explained with reference to FIG. 10.

When a change in main object area is requested in step S105 as described above, namely, when the rotary operation member is operated, the direction of the rotation is detected in step S501. In the first embodiment, a system of inputting a moving direction in the object space from the currently selected main object area to an object area which the operator desires using the single axis rotary operation member DL (dial). When rotation to the left is detected, the process proceeds to step S502, whereas when rotation to the right is detected, the process proceeds to step S503.

In step S502 or S503, on the basis of the rotational direction detected in step S501, an object area on the left or right of the area which is currently selected as the main object area is set as a new main object area; accordingly, the main object area selection process is completed.

After the selection of main object area by manual operation is performed in step S106 as described above, the process returns to step S103, where a focal length is determined on the basis of information on the current main object area. Further, the lens is moved in step S104, and whether or not the current main object area is to be changed is determined in step S105, and depending upon the determined result, either exposure operation in step S106 or the main object area selection processing in step S107 is performed.

The operation of changing the main object area performed in step S501 and its subsequent steps is explained taking a scene in FIG. 12A as an example. If an object area of group number 3 in FIG. 12B is originally selected as the main object area, and if rotation of the dial to the right is detected in step S501, then an object area of group number 4 is selected as the new main object area, and lens is controlled to focus on an object in the new main object area of group number 4. If rotation of the dial to the right is detected again in step S501, then an object area of group number 6 is selected and set as the new main object area.

In order to show which object area is currently selected as the main object area, an area selected as the main object area, namely, blocks having the identical group number, is surrounded by a line on a screen of a viewfinder. Alternatively, a mark may be displayed at a rough center of the main object area.

When the object which the operator intends to is focused, by pushing the release shutter button until the switch SW2 is turned on, image sensing operation is realized as desired.

In the first embodiment as described above, only one single axis rotary operation member is used as an input member. However, the present invention is not limited to this, and two single axis rotary operation members whose rotation axes are orthogonal to each other may be used. In this case, four directions of rotation (i.e., up, down, left and right) may be detected. A slide-type direction designation member may be used instead of the rotary operation member. Further, an operation member, such as a track ball, capable of freely rotating in any direction may be used. In this case, operability of the camera would be improved.

Further, instead of designating the location of the main object area by an operation member, a priority order may be determined on the basis of the probabilities S(1) to S(Gnum), which are results of evaluation functions, by sorting the probabilities, and the main object area may be changed from an object area having a higher probability to an object area having a lower probability. In a case where only one single axis rotary operation member is provided to the camera, a system of better operability may be realized by changing the main object area in accordance with a priority order.

Second Embodiment

Next, a case where the operation member is a focusing system of an optical device, such as a camera, is explained as the second embodiment.

In the second embodiment, so called a full-time manual type camera, whose automatic focusing system can be also operated manually is considered. A basic structure of the camera is the same as that explained in the first embodiment; therefore, configuration elements which are important for explaining the second embodiment are mainly described.

Figure 13:
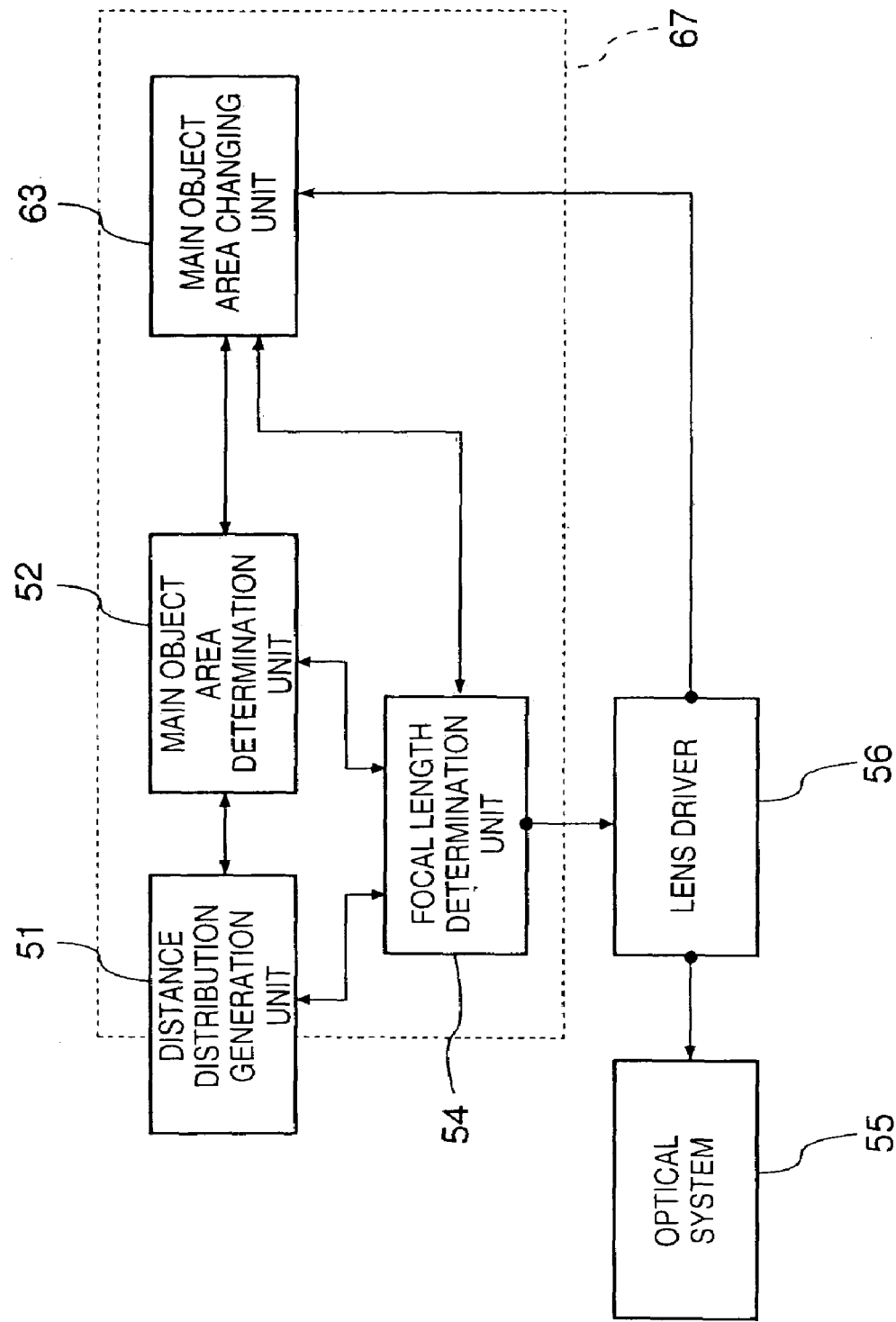
FIG. 13 is a block diagram illustrating a basic configuration of a camera according to a second embodiment of the present invention.

FIG. 13 is a block diagram showing basic configuration elements of the camera according to the second embodiment of the present invention. In FIG. 13, reference numerals 51, 52, 54 and 55 refer to the same elements 51, 52, 54 and 55 shown in FIG. 1. A main object area changing unit 63 is within a dotted line 67 which represents an area realized by a CPU, RAM and ROM of a computer, and a signal line from the lens driver 66 to the main object area changing unit 63 is added (for notifying the moving direction of focal distance control member), since the function of the operation member in the main object area changing unit 53 is moved to the lens driver 66.

Note, by configuring the system so that the signal flows from the lens controller 66 to the main object area changing unit 63 via the focal length determination unit 54, it is possible to simplify the configuration of the system.

Figure 14:
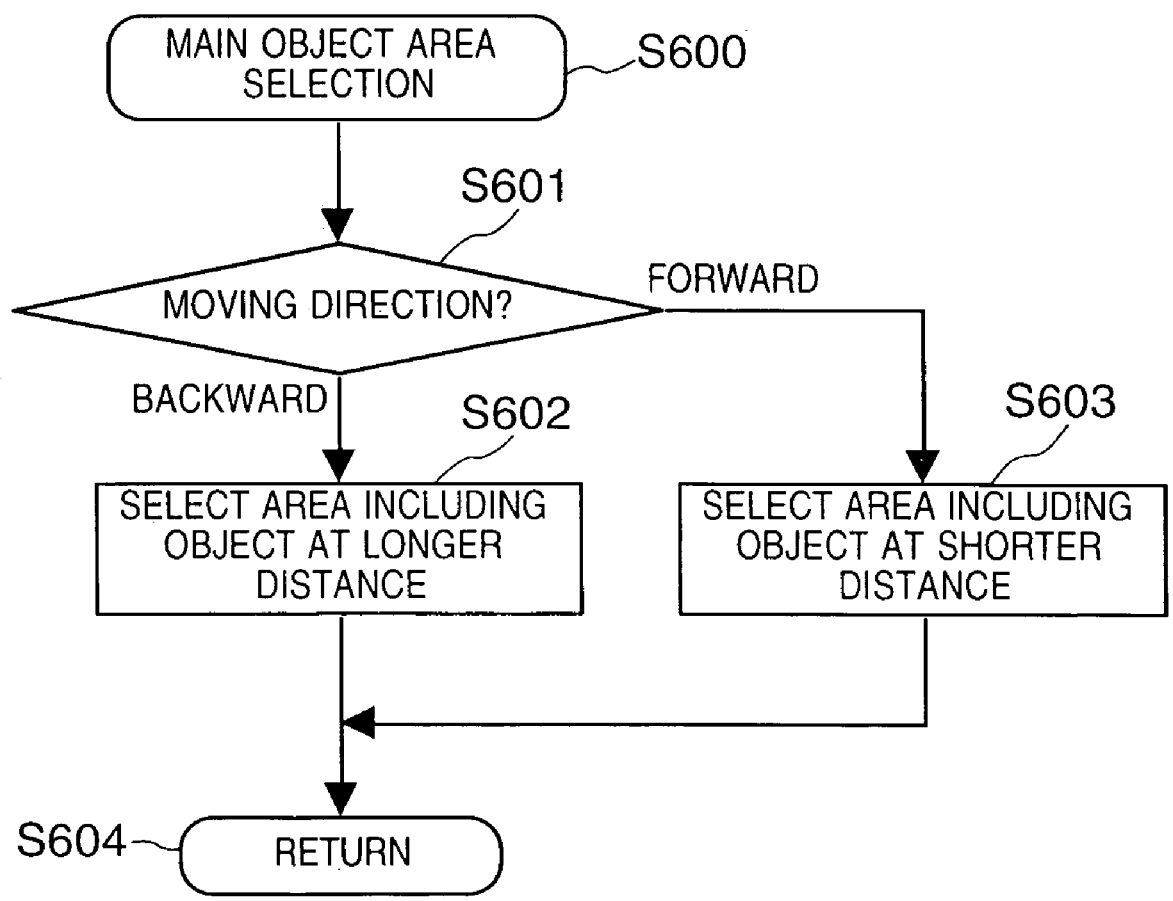
FIG. 14 is a flowchart of main object area selection processing according to the second embodiment of the present invention.

FIG. 14 is a flowchart of a main object area selection processing according to the second embodiment of the present invention.

Figure 10:
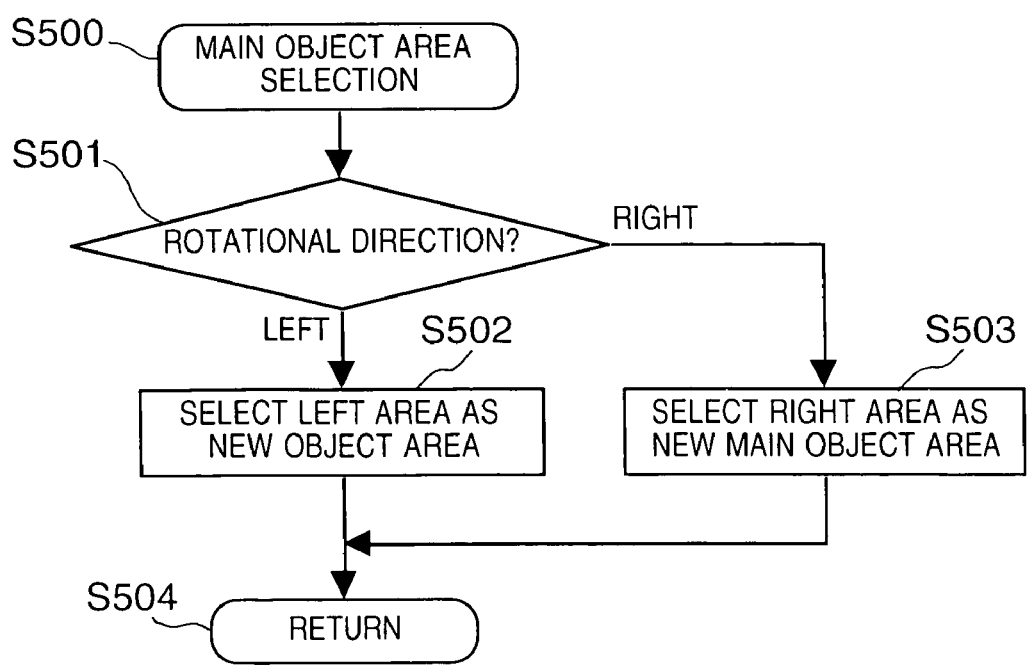
FIG. 10 is a flowchart of main object area selection processing according to the first embodiment of the present invention.

In the processing shown in FIG. 14, different from the processing shown in FIG. 10, the moving direction of the focusing system (rotation to the right and left when a normal rotation type focusing system is adopted) is determined in step S601, and depending upon the moving direction of either forward (in the approaching direction to the camera) or backward (in the receding direction from the camera), the main object area is changed to an object area which includes an object at a shorter distance in step S603 or an object area which includes an object at a longer distance in step S602.

More specifically, when the operator wishes to focus on an object which is at a shorter distance or at a longer distance than the distance where the currently focused object exists, the operator operates the focusing system in the desired direction, and the main object area is automatically changed to an object area which is in the direction the operator desires.

The operation of changing the main object area is explained taking a scene in FIG. 12A as an example, similarly to the first embodiment. If an object area of group number 3 in FIG. 12B is originally selected as the main object area, and if rotation of the focusing system in the direction to focus on an object at a longer distance is detected in step S601, then an object area which includes an object existing at a longer distance than the area of group number 3 is determined as the main object area on the basis of the distance value or the defocused amount detected in step S101 of FIG. 6. In this case, an object area labeled group number 4 is set as the new main object area, the focusing system is controlled so as to focus on the object in the new main object area. If the similar rotation of the focusing system is detected again in step S601, then an object area which includes an object existing at a longer distance than the area of group number 4, in this case an object area of group number 6, is selected and set as the new main object area.

According to the first and second embodiments of the present invention as described above, a main object area which is automatically determined is checked by an operator, and if the determined area is not the area where the operator intends to focus on, it is possible for the operator to change the main object area to an arbitrary area by operating a predetermined operation member.

Accordingly, a camera capable of performing focus control while reflecting intention of the operator with easy operation is realized.

The present invention is not limited to the above embodiments and various changes and modifications can be made within the spirit and scope of the present invention. Therefore to appraise the public of the scope of the present invention, the following claims are made.

What is claimed is:

1. An optical device comprising:
   a dividing unit that divides an image sensed by an image sensor into a plurality of areas;
   a grouping unit that generates a focus map and groups the divided areas of the sensed image into object areas based on the generated focus map;
   a main object area determination unit that determines a main object area out of the object areas grouped by said grouping unit;
   a focus controller that focuses on the determined main object area using information of the focus map;
   a main object area changing unit that (a) changes the main object area determined by said main object area determination unit to another one of the object areas using information of the object areas grouped by said grouping unit and (b) then causes said focus controller to focus on the new main object area using information of the focus map.

2. The optical device according to claim 1, wherein said main object area changing unit has a direction designation unit that designates a direction which is perpendicular to an optical axis of the optical device, and said main object area changing unit changes to an area next to the main object area in the direction designated by said direction designation unit as the new main object area.

3. The optical device according to claim 2, wherein said direction designation unit comprises a rotary operation member capable of rotating at least in two directions.

4. The optical device according to claim 3, wherein said direction designation unit is configured with a plurality of said rotary operation members.

5. The optical device according to claim 2, wherein said direction designation unit comprises a slide-type designation member capable of designating at least two directions.

6. The optical device according to claim 5, wherein said direction designation unit is configured with a plurality of said slide-type designation members.

7. The optical device according to claim 2, wherein said direction designation unit is a track ball.

8. The optical device according to claim 2, wherein said direction designation member is operated manually.

9. The optical device according to claim 1, wherein said grouping unit groups the divided areas in the sensed image on the basis of distances to objects included in the sensed image, and said main object area changing unit has a direction designation unit that designates a direction along an optical axis of the optical device, and said main object area changing unit changes to an area including an object a distance to which is next shorter or longer than a distance to an object included in the main object area as the new main object area depending upon the direction designated by said direction designation unit.

10. The optical device according to claim 9, wherein said direction designation unit is a focusing member of an image sensing optical system.

11. The optical device according to claim 10, wherein said direction designation unit is operated manually.

12. The optical device according to claim 1, further comprising an evaluation unit that calculates an evaluation value by performing a predetermined operation for each of the object areas grouped by said grouping unit, wherein said main object area determination unit determines the main object area on the basis of the evaluation value calculated for each of the object areas by said evaluation unit.

13. The optical device according to claim 1, wherein said main object area determination unit automatically determines the main object area.

14. The optical device according to claim 1, further comprising a priority order determination unit that determines a priority order, wherein said main object area changing unit changes the main object area in the descending order of the priority order.

15. The optical device according to claim 14, further comprising an evaluation unit that calculates an evaluation value by performing a predetermined operation for each of the object areas grouped by said grouping unit, wherein said priority order determination unit determines the priority order on the basis of the evaluation value calculated for each of the object areas by said evaluation.

16. A distance measuring point selection method comprising:
    a dividing step of dividing a sensed image into a plurality of areas;
    a grouping step of generating a focus map and grouping the divided areas of the sensed image into object areas based on the generated focus map;
    a main object area determination step of determining a main object area out of the object areas grouped in said grouping step;
    a first focus control step of focusing on the main object area determined in said main object area determination step using information of the focus map;
    a main object area changing step of changing the main object area determined in said main object area determination step to another one of the object areas using information of the object area grouped in said grouping step; and
    a second focus control step of changing to focus on the new main object area using information of the focus map when the main object area is changed in said main object area changing step.

17. The distance measuring point selection method according to claim 16, wherein, in said main object area changing step, an area next to the main object area in a direction designated from outside is selected as the new main object area.

18. The distance measuring point selection method according to claim 17, wherein the direction designated from outside is selected from at least two directions.

19. The distance measuring point selection method according to claim 18, wherein the direction designated from outside is perpendicular to an optical axis.

20. The distance measuring point selection method according to claim 16, wherein, in said grouping step, the divided areas in the sensed image are grouped on the basis of distances to objects included in the sensed image, and, in said main object area changing step, an area including an object a distance to which is next shorter or longer than a distance to an object included in the main object area is selected as the new main object area depending upon a direction designated from outside.

21. The distance measuring point selection method according to claim 20, wherein the direction designated from outside is an optical direction.

22. The distance measuring point selection method according to claim 16, further comprising an evaluation step of calculating an evaluation value by performing a predetermined operation for each of the object areas grouped in said grouping step, wherein, in said main object area determination step, the main object area is determined on the basis of the evaluation value calculated for each of the object areas in said evaluation step.

23. The distance measuring point selection method according to claim 16, wherein, in said main object area determination step, the main object area is automatically determined.

24. The distance measuring point selection method according to claim 16, further comprising a priority order determination step of determining a priority order, wherein, in said main object area changing step, the main object area is changed in the descending order of the priority order.

25. The distance measuring point selection method according to claim 24, further comprising an evaluation step of calculating an evaluation value by performing a predetermined operation for each of the object areas grouped in said grouping step, wherein in said priority order determination step, the priority order is determined on the basis of the evaluation value calculated for each of the object areas in said evaluation step.

26. An optical device comprising:
 a grouping unit that (a) generates a focus map of a scene by determining for each of a plurality of predetermined unit areas of the scene a value which represents a distance to a content included in each predetermined unit area based on phase difference between a pair of images of the scene sensed by an image sensor, and (b) groups the predetermined unit areas of the scene into object areas based on the generated focus map;
 a main object area determination unit that determines a main object area out of the object areas grouped by said grouping unit;
 a focus controller that focuses on the determined main object area using information of the focus map;
 a main object area changing unit that (a) changes the main object area determined by said main object area determination unit to another one of the object areas using information on the object areas grouped by said grouping unit and (b) then causes said focus controller to focus on the new main object area using information of the focus map.

27. A distance measuring point selection method comprising:
 a grouping step of (a) generating a focus map of a scene by determining for each of a plurality of predetermined unit areas of the scene a value which represents a distance to a content included in each predetermined unit area based on phase difference between a pair of images of the scene sensed by an image sensor, and (b) grouping the predetermined unit areas of the scene into object areas based on the generated focus map;
 a main object area determination step of determining a main object area out of the object areas grouped in said grouping step;
 a first focus control step of focusing on the main object area determined in said main object area determination step using information of the focus map;
 a main object area changing step of changing the main object area determined in said main object area determination step to another one of the object areas using information on the object areas grouped in said grouping step; and
 a second focus control step of changing to focus on the new main object area when the main object area is changed in said main object area changing step using information of the focus map.

* * * * *

UNITED STATES PATENT AND TRADEMARK OFFICE
CERTIFICATE OF CORRECTION

| | | |
|---|---|---|
| PATENT NO. | : 7,071,985 B1 | Page 1 of 1 |
| APPLICATION NO. | : 09/217937 | |
| DATED | : July 4, 2006 | |
| INVENTOR(S) | : Hitoshi Onoda et al. | |

It is certified that error appears in the above-identified patent and that said Letters Patent is hereby corrected as shown below:

<u>COLUMN 3</u>:
Line 2, "an" should read --a--.

<u>COLUMN 4</u>:
Line 48, "incident" should read --are incident--.

<u>COLUMN 7</u>:
Line 59, "image" should read --images--.

<u>COLUMN 11</u>:
Line 57, "so called a" should read --a so-called--.

<u>COLUMN 12</u>:
Line 66, "appraise" should read --apprise--.

Signed and Sealed this

Twenty-second Day of May, 2007

JON W. DUDAS
*Director of the United States Patent and Trademark Office*